United States Patent
Seo et al.

(10) Patent No.: US 8,896,786 B2
(45) Date of Patent: Nov. 25, 2014

(54) LIQUID CRYSTAL DISPLAY DEVICE HAVING UNIFORM BRIGHTNESS

(75) Inventors: Jeong-Min Seo, Sungnam-si (KR);
Jee-Hong Min, Sungnam-si (KR);
Young-Chan Kim, Suwon-si (KR);
Moon-Gyu Lee, Suwon-si (KR);
Kyu-Seok Kim, Yongin-si (KR)

(73) Assignee: Samsung Display Co., Ltd. (KR)

( * ) Notice: Subject to any disclaimer, the term of this patent is extended or adjusted under 35 U.S.C. 154(b) by 566 days.

(21) Appl. No.: 12/561,201

(22) Filed: Sep. 16, 2009

(65) Prior Publication Data
US 2010/0085509 A1    Apr. 8, 2010

(30) Foreign Application Priority Data

Oct. 8, 2008 (KR) ......................... 10-2008-0098682

(51) Int. Cl.
*G02F 1/1335* (2006.01)
*F21V 7/04* (2006.01)
*F21V 8/00* (2006.01)

(52) U.S. Cl.
CPC ........ *G02F 1/133606* (2013.01); *G02B 6/0036* (2013.01); *G02F 2001/133607* (2013.01); *G02B 6/0038* (2013.01); *G02B 6/0068* (2013.01)
USPC .............. 349/65; 362/607; 362/612; 362/620

(58) Field of Classification Search
CPC .................................................... G02B 6/0038
USPC ........... 349/65; 362/615–620, 97.3, 606, 607, 362/612
See application file for complete search history.

(56) References Cited

U.S. PATENT DOCUMENTS

| | | | |
|---|---|---|---|
| 2003/0156234 A1* | 8/2003 | Chiou | 349/65 |
| 2004/0246697 A1* | 12/2004 | Yamashita et al. | 362/31 |
| 2005/0099815 A1* | 5/2005 | Kim et al. | 362/339 |
| 2006/0279296 A1* | 12/2006 | Lee et al. | 324/691 |
| 2007/0058388 A1* | 3/2007 | Takatori et al. | 362/554 |
| 2007/0253218 A1* | 11/2007 | Tanabe | 362/612 |
| 2008/0002428 A1* | 1/2008 | Byun et al. | 362/608 |
| 2008/0025687 A1* | 1/2008 | Lee et al. | 385/146 |
| 2008/0102408 A9* | 5/2008 | Schilling et al. | 430/311 |
| 2008/0112185 A1* | 5/2008 | Noh et al. | 362/606 |
| 2008/0130316 A1* | 6/2008 | Kinoshita et al. | 362/620 |
| 2010/0214509 A1* | 8/2010 | Sasaki et al. | 349/65 |

FOREIGN PATENT DOCUMENTS

| | | | |
|---|---|---|---|
| KR | 10-2001-0095035 A | | 11/2001 |
| KR | 10-2005-0044961 A | | 5/2005 |
| WO | WO 2009099219 A1 | * | 8/2009 |

* cited by examiner

*Primary Examiner* — Bumsuk Won
*Assistant Examiner* — Paisley L Arendt
(74) *Attorney, Agent, or Firm* — Innovation Counsel LLP

(57) ABSTRACT

A liquid crystal display device has brightness uniformity at its front and lateral sides. The liquid crystal display device includes a reflection sheet reflecting light; an optical plate including a substrate for guiding light, a height-varying portion formed on one surface of the substrate, not facing the reflection sheet, and a prism pattern formed on the height-varying portion; and a plurality of light sources arranged on one lateral surface of the optical plate in a first direction so as to correspond to a position of the height-varying portion having a height not greater than an average height from the one surface of the substrate to the height-varying portion. The prism pattern extends in a second direction substantially perpendicular to the first direction. The average height is in a range of about 0.1% to about 10% of the thickness of the substrate.

6 Claims, 17 Drawing Sheets

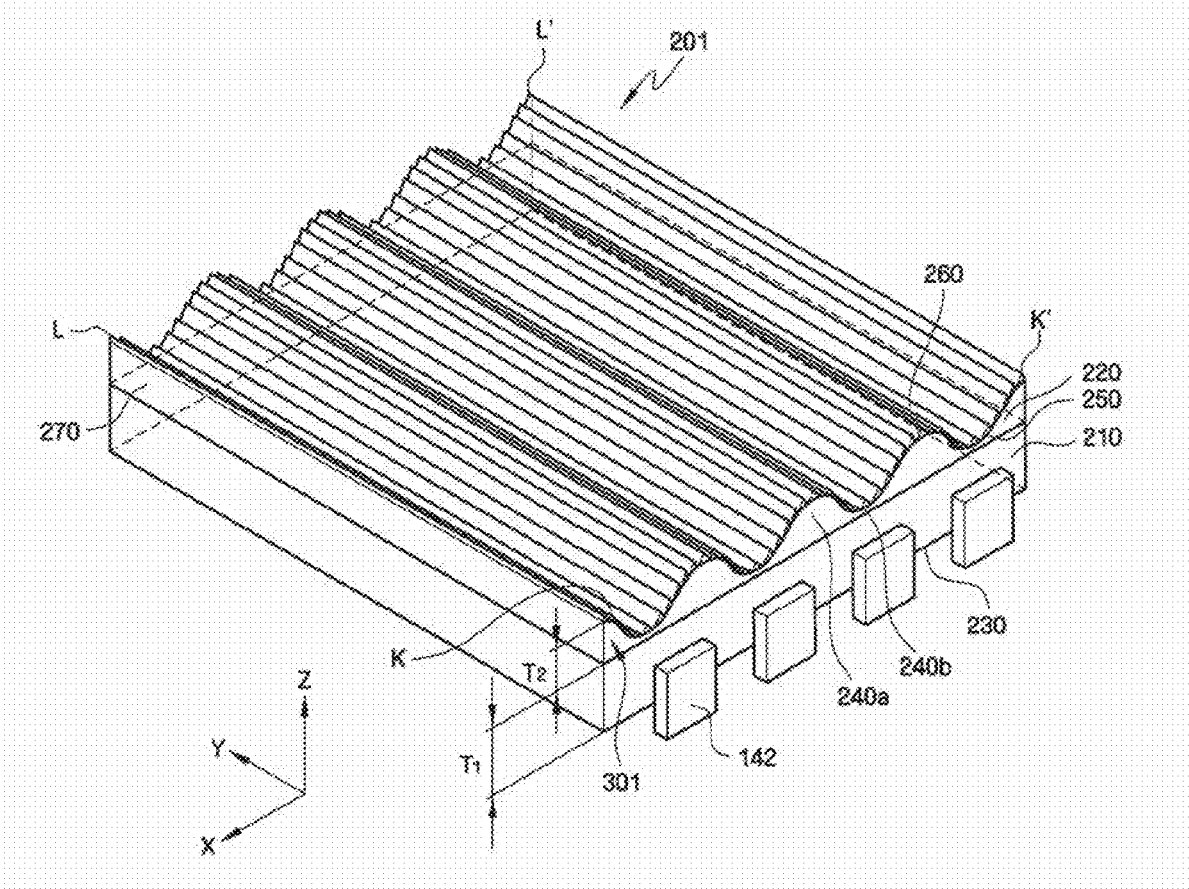

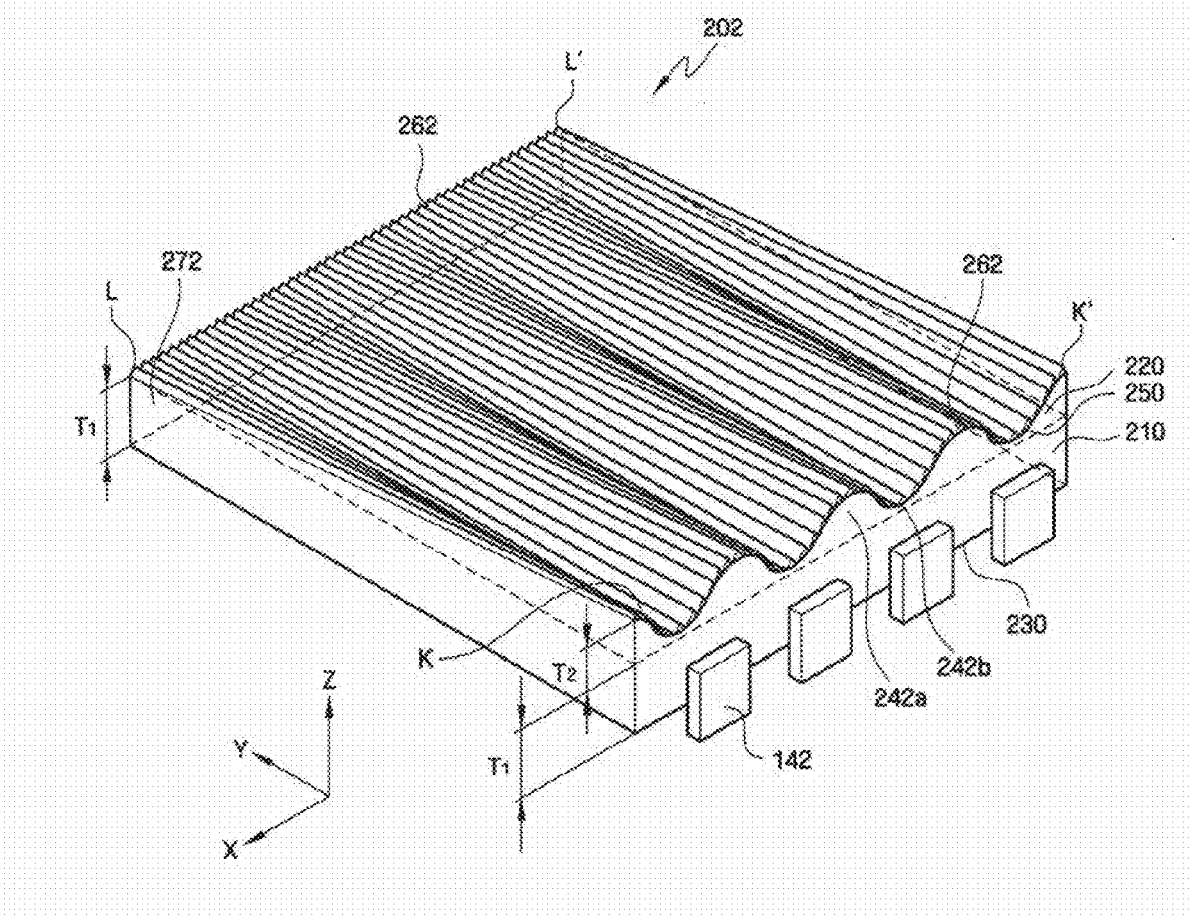

LIQUID CRYSTAL DISPLAY DEVICE HAVING UNIFORM BRIGHTNESS

CROSS-REFERENCE TO RELATED APPLICATION

This application claims priority and benefit from Korean Patent Application No. 10-2008-0098682 filed on Oct. 8, 2008 in the Korean Intellectual Property Office, the disclosure of which is incorporated herein by reference in its entirety.

BACKGROUND

1. Technical Field

Embodiments of the present invention generally relate to a liquid crystal display device, and more particularly, to a liquid crystal display device having uniform brightness distribution of its front and lateral sides.

2. Description of the Related Art

Liquid crystal display devices are one of the most commonly used flat panel displays (FPD). Liquid crystal display devices, which may include two panels having a plurality of electrodes arranged thereon and a liquid crystal layer interposed between the two panels, control the transmittance of incident light by applying voltages to the electrodes to rearrange liquid crystal molecules of the liquid crystal layer.

The liquid crystal display (LCD) device is not a self-emitting device. Hence, it may require a separate external light source for illuminating light. The external light source may be selected according to the size, use or purpose. Specifically, according to the type, the external light source may include, but not limited to, a point light source such as a light emitting diode (LED), a linear light source such as a cold cathode fluorescent lamp (CCFL), or a planar light source. As the external light source, a plurality of light sources may be arranged at a lateral side of an optical plate of an LCD device, such as a mobile phone, a computer monitor, a TV, or the like.

A bright line may be formed in an emission side of a plurality of light sources or a hot spot phenomenon may be generated at a liquid crystal panel positioned in the vicinity of the light sources, so that deterioration of visibility can be induced to frontal and lateral sides of the liquid crystal panel.

SUMMARY

Embodiments of the present invention provide a liquid crystal display device having brightness uniformity at its front and lateral sides.

According to an embodiment of the present invention, there is provided a liquid crystal display device that includes a reflection sheet reflecting light, an optical plate including a substrate for guiding light, a height-varying portion formed on one surface of the substrate, not facing the reflection sheet, and a prism pattern formed on the height-varying portion, and a plurality of light sources arranged on one lateral surface of the optical plate in a first direction so as to correspond to a position of the height-varying portion having a height not greater than an average height from the one surface of the substrate to the height-varying portion, wherein the prism pattern extends in a second direction substantially perpendicular to the first direction, and the average height is in a range of about 0.1% to about 10% of the thickness of the substrate.

According to another embodiment of the present invention, there is provided a liquid crystal display device including a reflection sheet reflecting light, an optical plate including a substrate for guiding light, and a plurality of prism patterns extending in parallel to one another in a first direction on one surface of the substrate facing the reflection sheet, and a plurality of light sources arranged on one lateral surface of the optical plate in the first direction, wherein each of the of prism patterns has a height-varying portion and the plurality of light sources arranged so as to correspond to a position of the height-varying portion having a height not greater than an average height of the plurality of prism patterns.

According to still another embodiment of the present invention, there is provided a liquid crystal display device including a reflection sheet reflecting light, an optical plate including a substrate for guiding light, a first height-varying portion formed on one surface of the substrate, not facing the reflection sheet, and a plurality of first prism patterns extending on the other surface of the substrate facing the reflection sheet in parallel to one another in a first direction, a plurality of light sources arranged on one lateral surface of the optical plate in the first direction, and a plurality of second prism patterns extending on the first height-varying portion in a second direction substantially perpendicular to the first direction, wherein each of the plurality of first prism patterns has a second height-varying portion, and the plurality of light sources are arranged so as to correspond to a position of the first height-varying portion having a height not greater than a first average height from the one surface of the substrate to the height-varying portion and a position of the second height-varying portion having a height not greater than a second average height of the first prism patterns.

BRIEF DESCRIPTION OF THE DRAWINGS

The above and other features and advantages of the embodiments of the present invention will become more apparent by describing in detail one or more embodiments with reference to the attached drawings in which:

FIG. 5 is a perspective view showing an optical plate for a liquid crystal display device according to a second exemplary embodiment of the present invention;

FIG. 6 is a perspective view showing an optical plate for a liquid crystal display device according to a third exemplary embodiment of the present invention;

DETAILED DESCRIPTION

Figure 1:
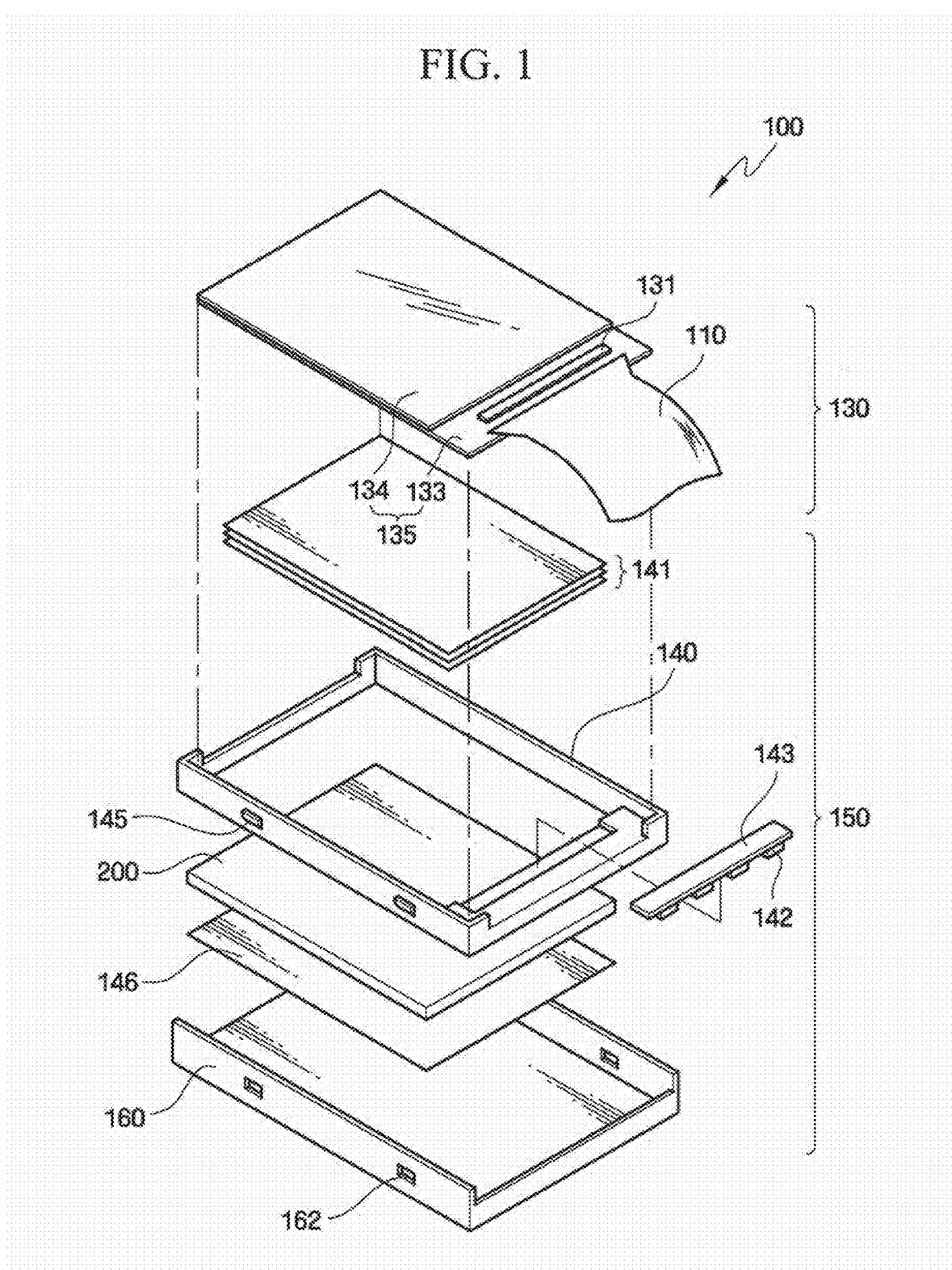
FIG. 1 is a layout view showing a liquid crystal display device according to a first exemplary embodiment of the present invention.

Advantages and features of the embodiments of the present disclosure and methods of accomplishing the same may be understood more readily by reference to the following detailed description and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and will only be defined by the appended claims. Like reference numerals refer to like elements throughout the specification. Accordingly, in some specific embodiments, well known processing steps, devices or methods will not be described in detail in order to avoid obscuring the disclosure.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A liquid crystal display (LCD) device according to one or more embodiments of the present invention may be used in a portable multimedia player (PMP), a personal digital assistant (PDA), a portable digital versatile disk (DVD) player, a cellular phone, and other devices. For explanatory convenience, the LCD device according to one or more embodiments of the present invention will be described as being used in a cellular phone. However, the embodiments of the present invention are not limited to this and include the above-mentioned LCD devices.

Hereinafter, exemplary embodiments of the present invention will be described in detail with reference to the accompanying drawings.

FIG. 1 is a layout view showing a liquid crystal display device according to a first exemplary embodiment of the present invention.

Referring to FIG. 1, the liquid crystal display (LCD) device 100 generally includes a liquid crystal panel assembly 130 and a back light assembly 150.

Here, the liquid crystal panel assembly 130 includes a liquid crystal panel 135 having a thin film transistor (TFT) substrate 133 and a color filter substrate 134, a liquid crystal (not shown), a driving IC 131, and a flexible printed circuit board (FPCB) 110.

The liquid crystal panel 135 is a device which displays image information such as a character, a number, or an arbitrary icon by adjusting the transmissivity of light that passes through a liquid crystal layer (not shown) according to the intensity of an applied voltage. The liquid crystal panel 135 includes the TFT substrate 133, the color filter substrate 134, and the liquid crystal (not shown).

The TFT substrate 133 includes a plurality of gate lines, a data line, and a pixel electrode. The gate lines extend in a transverse direction and transmit a gate signal. The data line extends in a longitudinal direction and transmits a data signal. A pixel is connected to the gate lines and the data line and includes a switching element and a storage capacitor.

Here, the switching element is formed at a cross-point of the gate line and the data line, and the storage capacitor and a liquid crystal capacitor are connected to an output terminal of the switching element. In addition, the switching element may be formed as a TFT using amorphous silicon and polysilicon as a channel layer.

The color filter substrate 134 is located on the TFT substrate 133 and includes a color filter that represents red, green, or blue color in a region corresponding to the pixel electrode so as to display color in each pixel. Here, the color filter may be formed above or below the pixel electrode. In addition, a common electrode formed of a transparent conductive material such as indium tin oxide (ITO) or indium zinc oxide (IZO) is formed on the color filter.

The liquid crystal layer (not shown) is filled between the color filter substrate 134 and the TFT substrate 133 and has dielectric anisotropy. The thickness of the liquid crystal layer (not shown) may be, for example, about 5 μm, and the liquid crystal layer may be twisted nematic (TN) arranged. The arrangement direction of the liquid crystal layer (not shown) may be changed by a voltage applied from the outside so that the transmissivity of light passing through the liquid crystal layer (not shown) may be adjusted.

The TFT substrate 133, the color filter substrate 134, and the liquid crystal layer (not shown), which are elements for the liquid crystal panel 135, constitute a liquid crystal capacitor. The liquid crystal capacitor having the above structure according to one or more embodiments may be connected to the output terminal of the switching element and the common voltage or a reference voltage.

The driving IC 131 is an integrated circuit (IC) which receives a gate control signal, a data control signal, and a data signal related to the data control signal from the FPCB 110 via an input terminal and provides a gate driving signal and a data driving signal to the gate line and the data line formed on the TFT panel 133 via an output terminal. As such, a desired image can be formed on the liquid crystal panel 135.

The FPCB 110 is a kind of PCB which connects various electronic components to a printed circuit original board or supports the electronic components according to the circuit design of electric wires. The FPCB 110 may be flexible.

One end of the FPCB 110 is connected to an external PCB (not shown), and the other end thereof is connected to an input terminal of the driving IC 131. As such, the gate driving signal, the data driving signal, and the data signal related to the data driving signal are transmitted to the driving IC 131 from the external PCB.

The backlight assembly 150 according to an embodiment of the present invention includes optical sheets 141, a light source 142, an alignment plate 143, a reflection sheet 146, an optical plate 200, an upper receiving container 140 receiving them, and a lower receiving container 160 combined with the upper receiving container 140.

The upper receiving container 140 has sidewalls formed along an edge shaped of a rectangular opening, for example, and a predetermined protrusion (not shown) is formed in the rectangular opening formed by the sidewalls, so that the upper receiving container 140 receives the optical plate 141 and the liquid crystal panel assembly 130 and prevents the sheets from sagging.

The FPCB 110 of the liquid crystal panel assembly 130 is bent centering on one sidewall of the upper receiving container 140. Here, the upper receiving container 140 may be formed in a variety of shapes according to a method of receiving the liquid crystal panel assembly 130, the optical sheets 141, the alignment plate 143, the light source 142, and the reflection sheet 146. Meanwhile, a recess on which the alignment plate 143 having the light source 142 disposed thereon may be provided at one or both sides of the upper receiving container 140.

The optical sheets 141 are disposed on the upper surface of the light source 142 and are used to diffuse and condense light transmitted from the light source 142. The optical sheets 141 may include a diffusion sheet, a prism sheet, a protective sheet, and the like, in one example.

The diffusion sheet placed between the light source 142 and the prism sheet is used to disperse the light emitted from the light source 142 and to prevent light from being partially concentrated. The prism sheet is formed in such a way that a trigonal prism is formed in a predetermined arrangement at the upper side of the prism sheet. The prism sheet generally includes two sheets and is used to condense light diffused from the diffusion sheet when each prism arrangement is disposed to cross each other at a predetermined angle, in a direction perpendicular to the liquid crystal panel 135. As such, most of the light that passes through the prism sheet proceeds in a horizontal direction and brightness is uniformly distributed on the protective sheet. The protective sheet formed on the prism sheet is used to protect the surface of the prism sheet and to diffuse light so as to make the diffusion of light uniform.

The light source 142 provides light to the LCD device 100 that cannot emit light by itself. The light source 142 may include a plurality of lamps arranged on the alignment plate 143 in a first direction to then be disposed at one or both sides of the optical plate 200. The alignment plate 143 may be attached to a light source cover to reduce loss of the light emitted from the light source 142. The light source 142 may be, but is not limited to, a point light source such as a light emitting diode (LED), a linear light source such as a cold cathode fluorescent lamp (CCFL), a hot cathode fluorescent lamp (HCFL), or an external electrode fluorescent lamp (EEFL), or any other type of light source. In the following examples, embodiments of the invention are described with regard to the light source 142 using a point light source as an example.

The optical plate 200 is disposed below the upper receiving container 140 so that at least one side thereof faces the light source 142 and guides the light emitted from the light source 142. In this embodiment, the optical plate 200 serves to focus light and adjust the quantity of light. The optical plate 200 may be a transparent material capable of effectively guiding light, for example, a material having a high refractive index such as polymethylmethacrylate-series resin (PMMA), polycarbonate-series resin (PC), etc.

Light which is incident into a lateral side of the optical plate 200 made of the above-mentioned material has an incident angle that is not greater than a critical angle of the optical plate 200, the incident light travels inside the optical plate 200. When the light is incident into a top surface or a bottom surface of the optical plate 200, the incidence of angle is greater than a critical angle, so that the incident light is not emitted outside the optical plate 200 but is substantially uniformly dispersed in the optical plate 200. Scattering patterns (not shown) are formed on at least one of the top and bottom surfaces of the optical plate 200. The scattering patterns transmit the light that is incident into the top or bottom surface of the optical plate 200 to the liquid crystal panel 135. The shape of the optical plate 200 will later be described in detail.

The reflection sheet 146 is disposed below the optical plate 200 and reflects light upward from below the optical plate 200. The reflection sheet 146 reflects the light that is not reflected by fine dot patterns formed at the rear side of the optical plate 200 into the emission side of the optical plate 200 so that loss of light incident into the liquid crystal panel 135 may be reduced and the uniformity of light transmitted to the emission side of the optical plate 200 may be improved. The reflection sheet 146 extends to the lower portion of the alignment plate 143 from the lower side of the optical plate 200, thereby suppressing light leakage between the alignment plate 143 and the optical plate 200.

The upper receiving container 140 may be hook-coupled to the lower receiving container 160. For example, a hook 145 may be formed along an outer side of the sidewall of the upper receiving container 140, and a hook insertion hole 162 corresponding to the hook 145 may be formed at a side of the lower receiving container 160. Thus, the lower receiving container 160 is aligned with the lower portion of the upper receiving container 140 so that the hook 145 formed in the upper receiving container 140 is inserted into the hook insertion hole 162 of the lower receiving container 160 so that the upper receiving container 140 and the lower receiving container 160 may be combined with each other. In addition, the upper receiving container 140 and the lower receiving container 160 may be coupled to each other by various means and methods.

Figure 2:
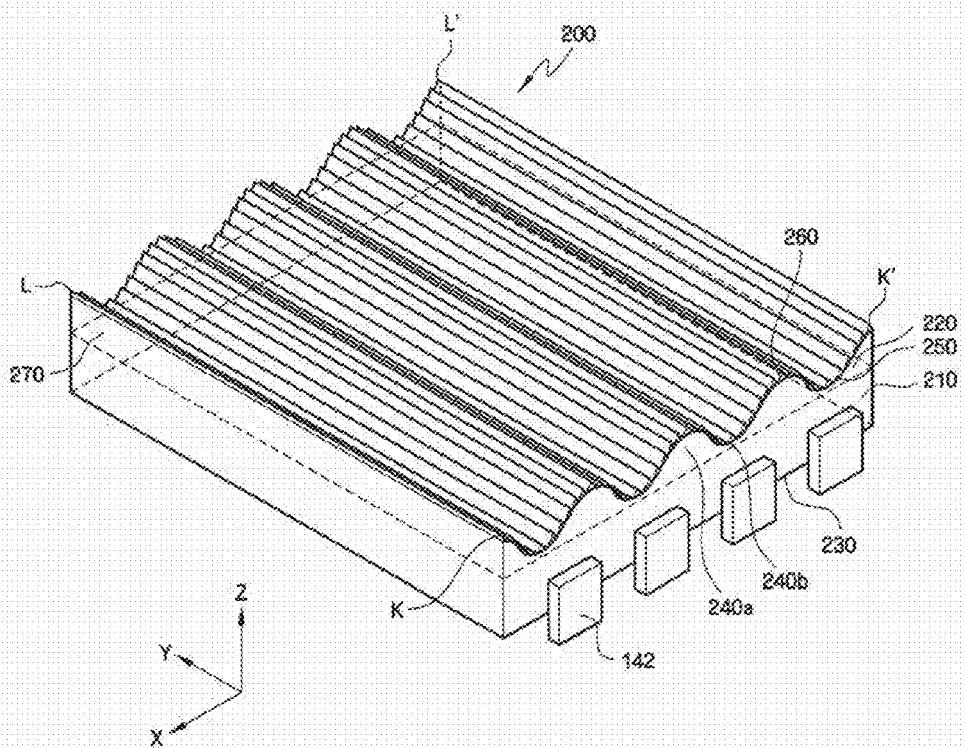
FIG. 2 is a perspective view showing an optical plate for the liquid crystal display device shown in FIG. 1.

Hereinafter, an optical plate for the liquid crystal display device shown in FIG. 1 will be described in detail according to one or more embodiments with reference to FIGS. 2 through 4B. FIG. 2 is a perspective view showing an optical plate for the liquid crystal display device shown in FIG. 1, and FIG. 3 is a view showing a positional relationship between an optical plate and a light source when viewed in the Y-axis direction shown in FIG. 2.

Figure 3:
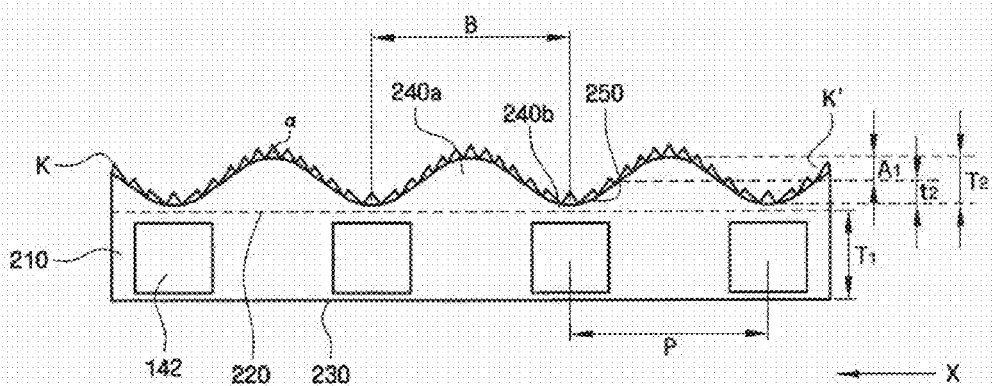
FIG. 3 is a view showing a positional relationship between an optical plate and a light source when viewed in the Y-axis direction shown in FIG. 2.

Referring to FIGS. 1 through 3, the optical plate 200 according to the present embodiment is constructed to have different thicknesses according to its position.

The optical plate 200 has a substrate composed of surfaces 210, 220, 230, and 270 having a uniform thickness T1, and a height-varying portion, e.g., a curved portion 250, formed on one surface 220 of the substrate's surfaces 210, 220, 230, and 270 facing the reflection sheet 146.

Each of the substrate's surfaces 210, 220, 230, and 270 may be shaped as a rectangle having a predetermined thickness TX, for example.

The curved portion 250 may be formed on the one surface 220 of the substrate's surfaces 210, 220, 230, and 270. The curved portion 250 may have a plurality of convex portions 240a and a plurality of concave portions 240b which are alternately arranged. Here, each of the convex portions 240a comprises a portion having a height greater than an average height $t_2$ between the surface 220 of the substrate's surfaces 210, 220, 230, and 270 and the curved portion 250. Each of the concave portions 240b comprises a portion having a height smaller than the average height $t_2$ between the other surface 230 of the substrate's surfaces 210, 220, 230, and 270 and the curved portion 250. The minimum height of the concave portions 240b may correspond to positions contacting the substrate's surfaces 210, 220, 230, and 270, and the maximum height $T_2$ of the convex portions 240a may correspond to a position having a height twice the average height $t_2$ of the curved portion 250.

The convex portions 240a and the concave portions 240b are alternately arranged at a regular spacing, forming a sine curve. The amplitude $A_1$ of the sine curve or the average height $t_2$ of the curved portion 250 may be in the range of about 0.1% to about 10% of the thickness of the substrate's surfaces 210, 220, 230, and 270 in consideration of the brightness uniformity of the LCD device 100. Under these conditions, the brightness levels viewed at front and side surfaces of the liquid crystal panel 135 may become uniform.

The plurality of light sources 142 are arranged along the first direction, e.g., the X-axis direction, at a predetermined pitch P, so that light may be emitted to the one surface 210 of the optical plate 200. The pitch P between each of the plurality of light sources 142 may range from about 5 to about 15 μm, and may vary according to the size and product features of the LCD device 100. The light sources 142 may be formed on the one surface 210 of the optical plate 200 having the concave portions 240b. The thicker the optical plate 200, the more the light received therein, and vice versa, and the portions where the plurality of light sources 142 are arranged have a larger number of light sources than the portions where the plurality of light sources 142 are spaced apart from each other. Accordingly, the light sources 142 are arranged in the concave portions 240b and the amplitude $A_1$ of the sine curve formed by the curved portion 250 or the average height $t_2$ of the curved portion 250 may be adjusted to be in the range of about 0.1% to about 10% of the thickness of the substrate's surfaces 210, 220, 230, and 270, thereby providing the LCD device 100 with brightness uniformity.

The pitch P between each of the plurality of light sources 142 may correspond to a spacing B between adjacent concave portions 240b.

Meanwhile, the convex portions 240a and the concave portions 240b may extend along a second direction substantially perpendicular to the first (X-axis) direction, e.g., the Y-axis direction. That is to say, the convex portions 240a and the concave portions 240b may be shaped of a hemispherical column extending in the second direction, i.e., the Y-axis direction.

In the present embodiment, the convex portions 240a and the concave portions 240b may have a prism pattern 260. The prism pattern 260 focuses the light emitted from the light source 142 to the liquid crystal panel 135, and improves brightness uniformity of the LCD device 100.

The prism pattern 260 may extend in parallel to the convex portions 240a and the concave portions 240b in the second direction, i.e., the Y-axis direction. The prism pattern 260 may be shaped of a triangular column arranged along the convex portions 240a and the concave portions 240b. In the present embodiment, the prism pattern 260 may have the same height throughout the optical plate 200 from one end to the other side, that is, from an end indicated by K-K' to the opposite end indicated by L-L'.

The vertical angle α of the prism pattern 260 may range from about 90° to about 150° in consideration of, for example, focusing efficiency. A radial direction of the prism pattern 260 formed on the convex portions 240a and the concave portions 240b may be perpendicular to the other surface 230 of the substrate's surfaces 210, 220, 230, and 270, the Z-axis direction.

In the LCD device 100 according to this embodiment, the curved portion 250 and the prism pattern 260 may be formed of the same material as the substrate's surfaces 210, 220, 230, and 270, and may be integrally formed with the substrate's surfaces 210, 220, 230, and 270. In this embodiment, the curved portion 250 may be formed by, for example, engraving one surface 220 of the substrate's surfaces 210, 220, 230, and 270.

Figure 4A:
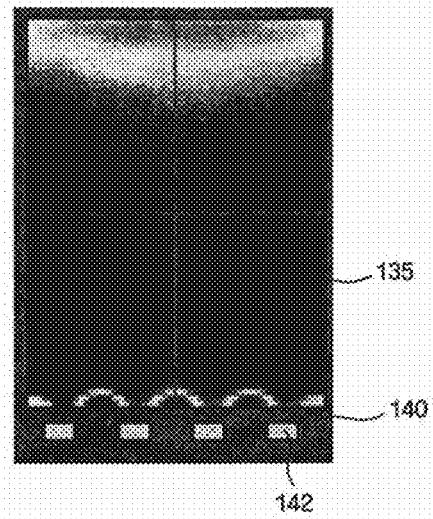
FIGS. 4A and 4B are photographic representations illustrating uniformity in the brightness distribution of the LCD device according to the first exemplary embodiment of the present invention and an LCD device according to a Comparative Example.
Figure 4B:
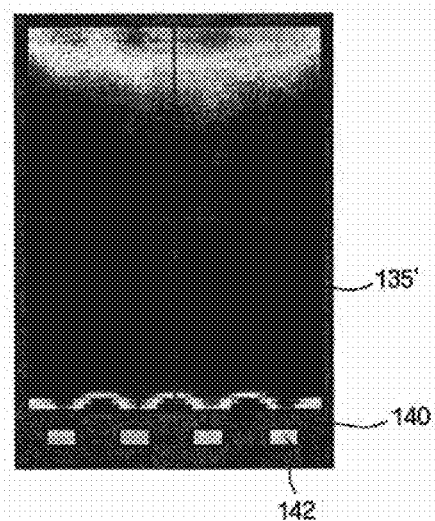

Hereinafter, brightness uniformity of the LCD device according to the first exemplary embodiment of the present invention and that of an LCD device according to a Comparative Example will be described with reference to FIGS. 1, 4A and 4B. FIGS. 4A and 4B are photographic representations illustrating the distribution of brightness uniformity of the LCD device according to the first exemplary embodiment of the present invention and that of an LCD device according to a Comparative Example.

Referring to FIGS. 1 and 4A, in the LCD device 100 having the curved portion 250 of the present embodiment, the liquid crystal panel 135 has improved brightness uniformity, compared to the liquid crystal panel 135'.

Hereinafter, an optical plate for a liquid crystal display device according to a second exemplary embodiment of the present invention will be described in detail with reference to FIG. 5. For the convenience of explanation, components each having the same function for describing the embodiment shown in FIG. 1 are respectively identified by the same reference numerals, and their repetitive description will be omitted or briefly made. FIG. 5 is a perspective view showing an optical plate for a liquid crystal display device according to a second exemplary embodiment of the present invention.

Referring to FIG. 5, in the optical plate 201 of the present embodiment, the curved portion 250 and the prism pattern 260 are formed on a light quantity adjusting portion 301 separately from the substrate's surfaces 210, 220, 230, and 270, and disposed on the substrate's surfaces 210, 220, 230, and 270. In detail, the curved portion 250 is formed separately from the substrate's surfaces 210, 220, 230 that are of substantially flat-type and then disposed thereon. The curved portion 250 may be attached to the substrate's surfaces 210, 220, 230, and 270 using, for example, a transparent adhesive agent or a double-sided tape. The curved portion 250 and the prism pattern 260 may be formed of the same material as the substrate's surfaces 210, 220, 230, and 270. However, according to one or more embodiments, the curved portion 250 and the prism pattern 260 may be formed of different materials than the substrate's surfaces 210, 220, 230, and 270.

The curved portion 250 and the prism pattern 260 may be formed of a monomer or copolymer such as polymethylmethacrylate (PMMA) or polyethyleneterephthalate, a transparent resin such as polycarbonate or polystyrene, a light-transmitting material such as transparent glass or transparent ceramic. If the curved portion 250 and the prism pattern 260 are formed separately from the substrate's surfaces 210, 220, 230, and 270, the fabrication efficiency may be improved according to separate and specialized fabrication processes. Furthermore, if the curved portion 250 and the prism pattern 260 are formed of different materials from the substrate's surfaces 210, 220, 230, and 270, the optical plate 201 having various light efficiencies may be fabricated.

According to this embodiment, the curved portion 250 and the prism pattern 260 may be integrally formed with each other. Alternatively, the prism pattern 260 may be separately formed from the curved portion 250 and then attached to the curved portion 250.

Hereinafter, an optical plate for a liquid crystal display device according to a third exemplary embodiment of the present invention will be described in detail with reference to FIG. 6. FIG. 6 is a perspective view showing an optical plate for a liquid crystal display device according to a third exemplary embodiment of the present invention.

Referring to FIG. 6, a difference in the height of the curved portion 250 according to the present embodiment gradually decreases along the second direction, i.e., Y-axis direction, from one end of the optical plate 202 to the other end thereof, that is, from an end indicated by K-K' to the opposite end indicated by L-L'.

In other words, a height difference between each of convex portions 242a and each of concave portions 242b is $T_2$ at one end of the optical plate 202, as indicated by K-K', and gradually decreases in the second direction, i.e., the Y-axis direction. Finally, the convex portions 240a and the concave portions 240b may not be formed at the other end of the optical plate 202, as indicated by L-L'.

A plurality of light sources 142 are arranged on the optical plate 202 in the first direction, e.g., the X-axis direction, and the convex portions 242a and the concave portions 242b extend along the second direction, e.g., the Y-axis direction. Accordingly, a difference in the brightness is generated between an area where the light sources 142 are provided and an area where the light sources 142 are not provided. The brightness difference may gradually decrease in the second direction of the optical plate 202, e.g., the Y-axis direction. The brightness difference may become zero at the end of the optical plate 202, as indicated by L-L'. Thus, the convex portions 242a and the concave portions 242b used for adjusting the quantity of light may not be provided at the end of the optical plate 202, as indicated by L-L'.

Meanwhile, a prism pattern 262 may be formed to have the same height throughout the optical plate 202 from an end indicated by K-K' to the opposite end indicated by L-L'. At the end L-L' of the optical plate 202, the prism pattern 262 may be formed on one surface 220 of the substrate's surfaces 210, 220, 230, and 272 that are of substantially flat-type.

Figure 7:
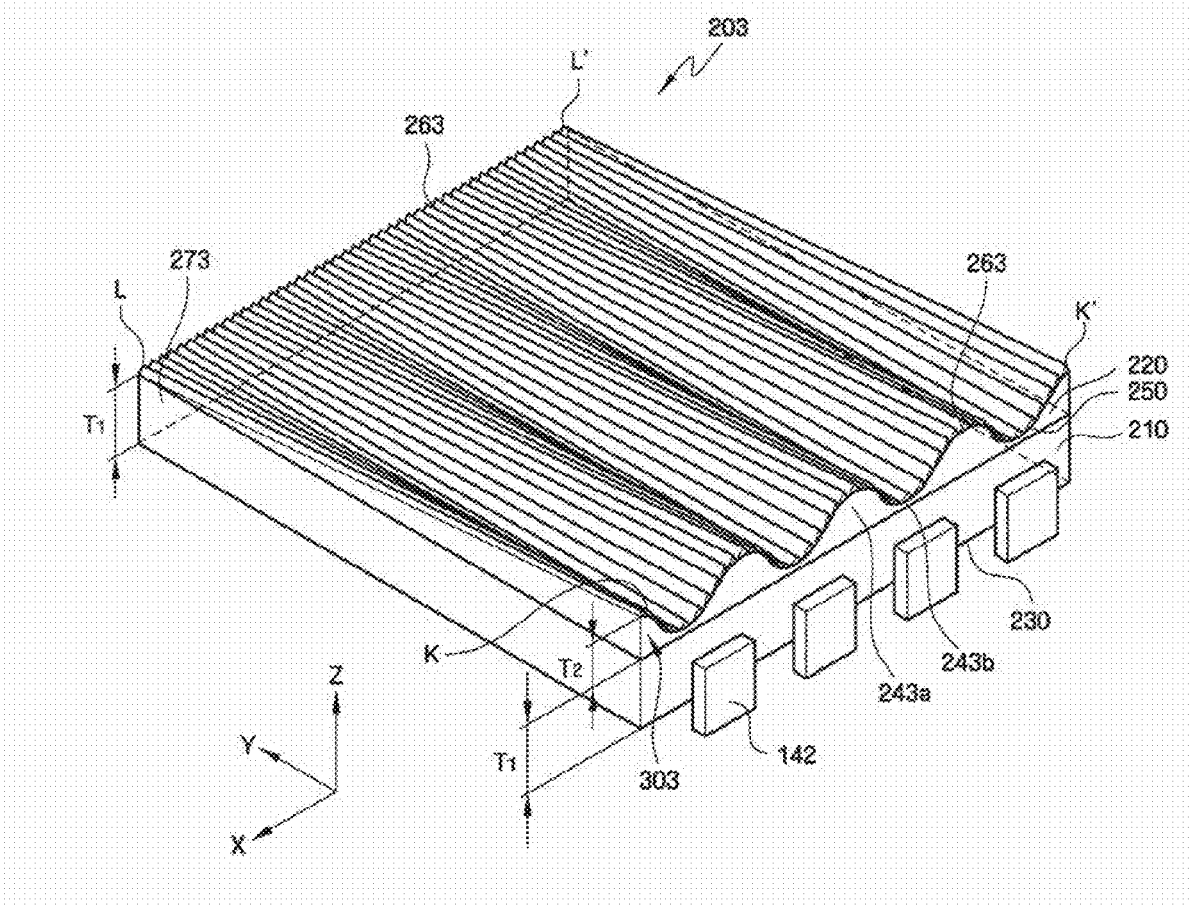
FIG. 7 is a perspective view showing an optical plate for a liquid crystal display device according to a fourth exemplary embodiment of the present invention.

Hereinafter, an optical plate for a liquid crystal display device according to a fourth exemplary embodiment of the present invention will be described in detail with reference to FIG. 7. FIG. 7 is a perspective view showing an optical plate for a liquid crystal display device according to a fourth exemplary embodiment of the present invention.

Referring to FIG. 7, the optical plate 203 of the present embodiment is substantially the same as that of the third embodiment, except that the curved portion 250 and a prism pattern 263 are formed separately from substrate's surfaces 210, 220, 230, and 273 and then disposed on a light quantity adjusting portion 303. The curved portion 250 and the prism pattern 263 are substantially the same as those of the second embodiment in view of the materials and fabrication method used.

Figure 8:
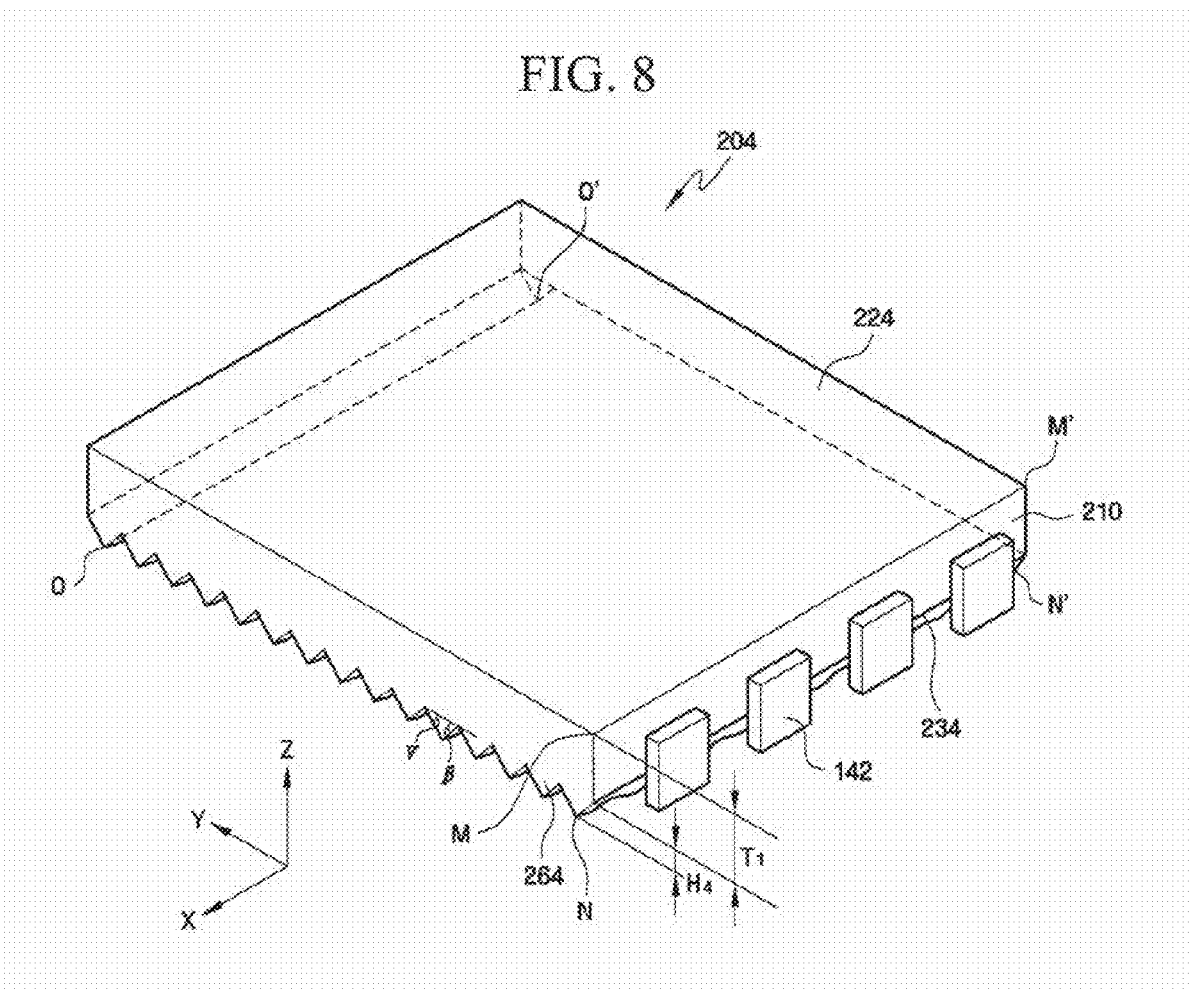
FIG. 8 is a perspective view showing an optical plate for a liquid crystal display device according to a fifth exemplary embodiment of the present invention.

Hereinafter, an optical plate for a liquid crystal display device according to a fifth exemplary embodiment of the present invention will be described in detail with reference to FIGS. 8 through 11B. FIG. 8 is a perspective view showing an optical plate for a liquid crystal display device according to a fifth exemplary embodiment of the present invention, FIG. 9 is a perspective view showing the bottom surface of the optical plate shown in FIG. 8, and FIG. 10 is a view showing a positional relationship between an optical plate and a light source when viewed in a direction of the Y axis shown in FIG. 9.

Figure 9:
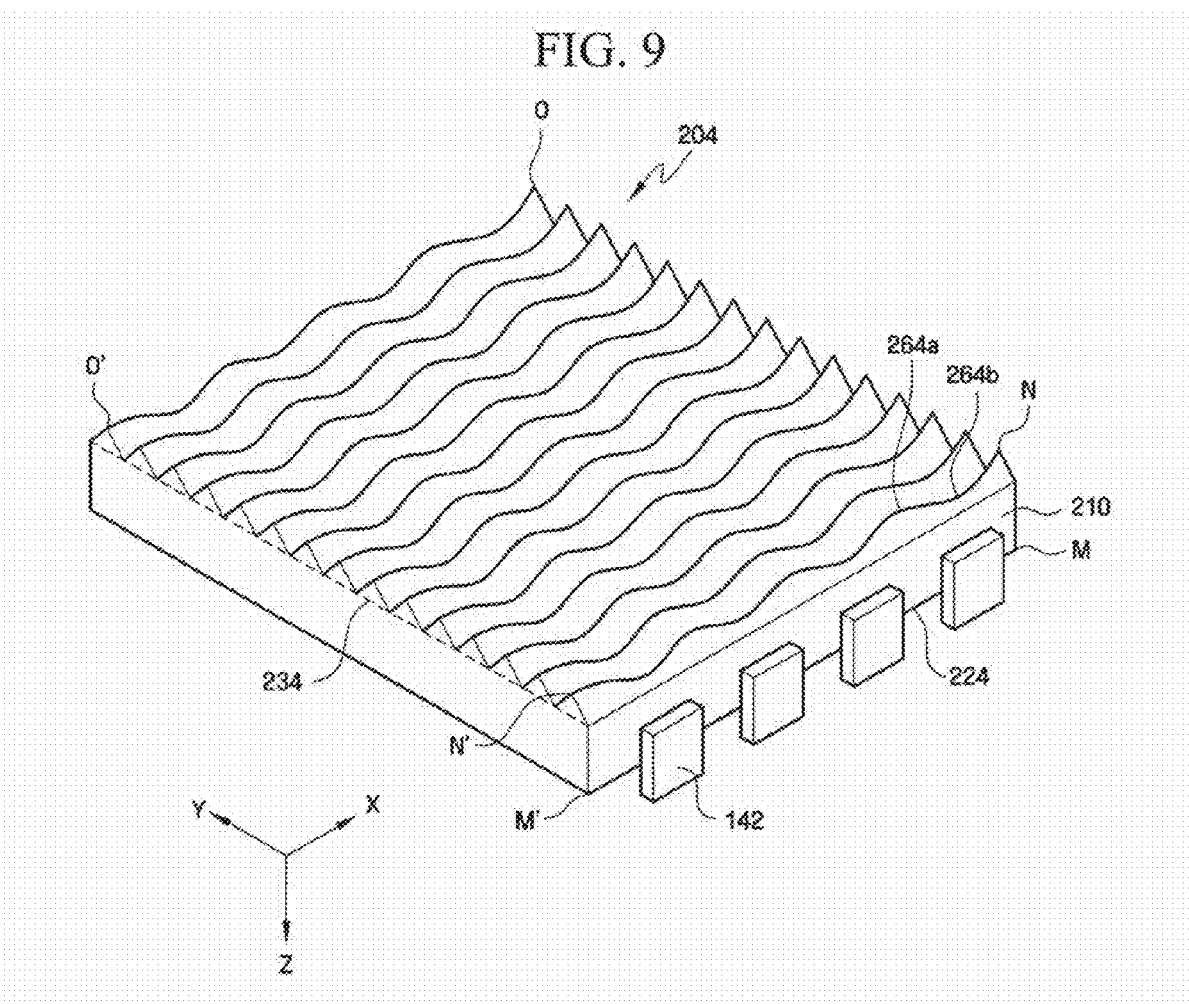
FIG. 9 is a perspective view showing the bottom surface of the optical plate shown in FIG. 8.

Referring to FIGS. 8 and 9, the optical plate 204 of the present embodiment includes a prism pattern 264. The prism pattern 264 may extend on one surface 234 of a plurality of substrate's surfaces 210, 224, and 234 along the first direction, i.e., the X-axis direction and disposed in parallel to the first direction. In other words, unlike in the previous embodiments, the prism pattern 264 of the present embodiment is formed on one surface 234 of the substrate's surfaces 210, 224, and 234, rather than the opposite surface 224 having a liquid crystal panel (not shown) formed thereon. That is, the prism pattern 264 is formed on the surface 234 of the substrate's surfaces 210, 224, and 234 facing the reflection sheet (146 of FIG. 1). In addition, the prism pattern 264 of the present embodiment extends along the same direction as light sources 142 arranged in the first direction, i.e., the X-axis direction. In order to emit the incident light in a direction perpendicular to the direction of incidence, i.e., in the Z-axis direction, the prism pattern 264 may be formed at a predetermined angle with respect to the one surface 234 of the substrate's surfaces 210, 224, and 234. That is, an angle β formed by the surface facing the light sources 142 and the surface 234 of the substrate's surfaces 210, 224, and 234 may range from about 35° to about 45°, and an angle γ formed by the plane opposite to the surface facing the light sources 142 and the surface 234 of the substrate's surfaces 210, 224, and 234 may range from about 2° to about 10°.

The prism pattern 264 may include a height-varying portion. That is, a top surface of the prism pattern 264 comprises a plurality of convex patterns 264a each having a greater height than the average height $h_4$ (illustrated, for example, in FIG. 10) of the prism pattern 264 and a plurality of concave patterns 264b each having a smaller height than the average height $h_4$ of the prism pattern 264, wherein the concave patterns 264b and the convex patterns 264a may alternate. In other words, the convex pattern 264a and the concave pattern 264b may alternate each other at a regular spacing, forming a sine curve. The height $H_4$ of the prism pattern 264 may be uniform at the one end N-N' of the optical plate 204 and the other end O-O' of the optical plate 204, as indicated by M-N' and M-N, respectively.

Figure 10:
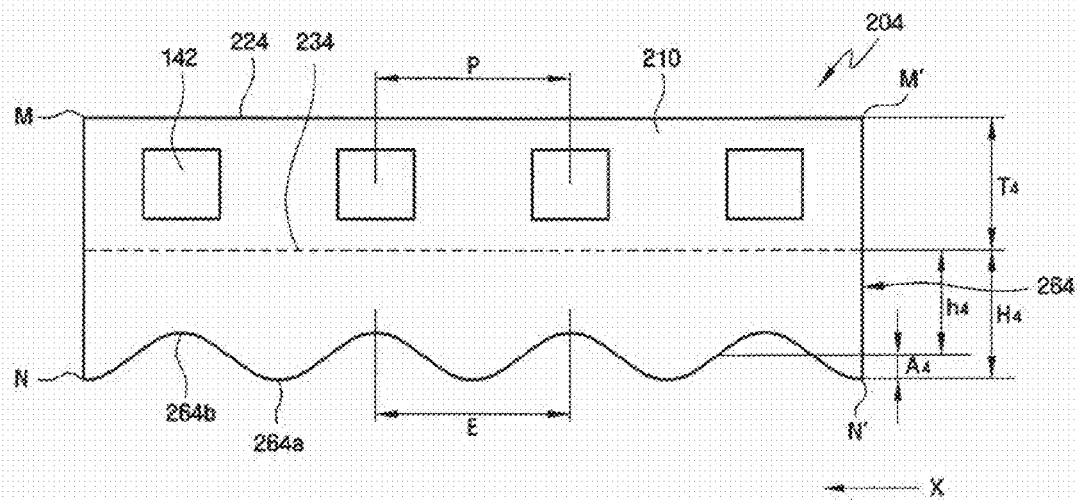
FIG. 10 is a view showing a positional relationship between an optical plate and a light source when viewed in the Y-axis direction shown in FIG. 9.

Referring to FIGS. 8 through 10, the light sources 142 may be arranged on the surface 210 of the substrate's surfaces 210, 224, and 234. Specifically, a predetermined pitch P in which the light sources 142 are arranged may be the same as a spacing E in which the concave patterns 264b are spaced apart from each other. Accordingly, an amount of light that is incident light from the light sources 142 and exits through the optical plate 204 may become similar to that of light at the area where the light sources 142 are not provided. In order to allow the distribution of brightness uniformly viewed from a liquid crystal panel, a height difference $A_4$ between a maximum height $H_4$ of the prism pattern 264 at the convex pattern 264a and the average height $h_4$ of the prism pattern 264 may be adjusted to be in a range of about 0.1% to about 10%. Accordingly, brightness uniformity of the liquid crystal panel may be achieved, both in the area where the light sources 142 are arranged and the spacing between adjacent light sources 142.

According to this embodiment, the substrate's surfaces 210, 224, and 234 and the prism pattern 264 may be integrally formed with each other using the same material.

Figure 11A:
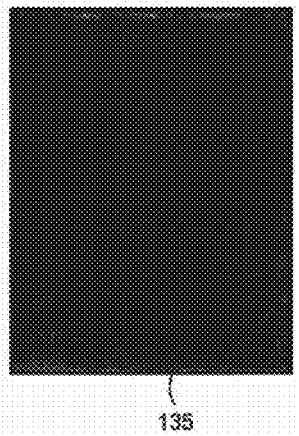
FIGS. 11A and 11B are photographic representations illustrating uniformity in the brightness distribution of the LCD device according to the fifth exemplary embodiment of the present invention and the LCD device according to a Comparative Example.
Figure 11B:
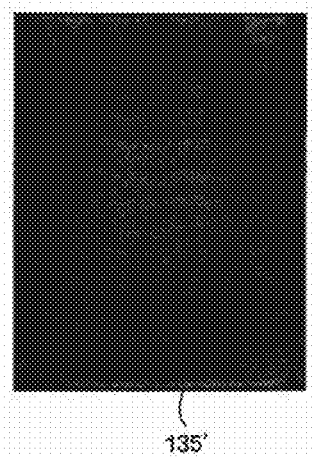

Hereinafter, brightness uniformity of the LCD device according to the fifth exemplary embodiment of the present invention and that of an LCD device according to a Comparative Example will be described with reference to FIGS. 11A and 11B. FIGS. 11A and 11B are photographic representations illustrating the distribution of brightness uniformity of the LCD device according to the fifth exemplary embodiment of the present invention and that of the LCD device according to a Comparative Example.

Referring to FIG. 11A, in the LCD device 100 according to the present embodiment, in which the convex portions 264a and the concave portions 264b are provided in the prism pattern 264, brightness uniformity of the liquid crystal panel 135 is improved, compared to that of the liquid crystal panel 135' according to the Comparative Example.

Figure 12:
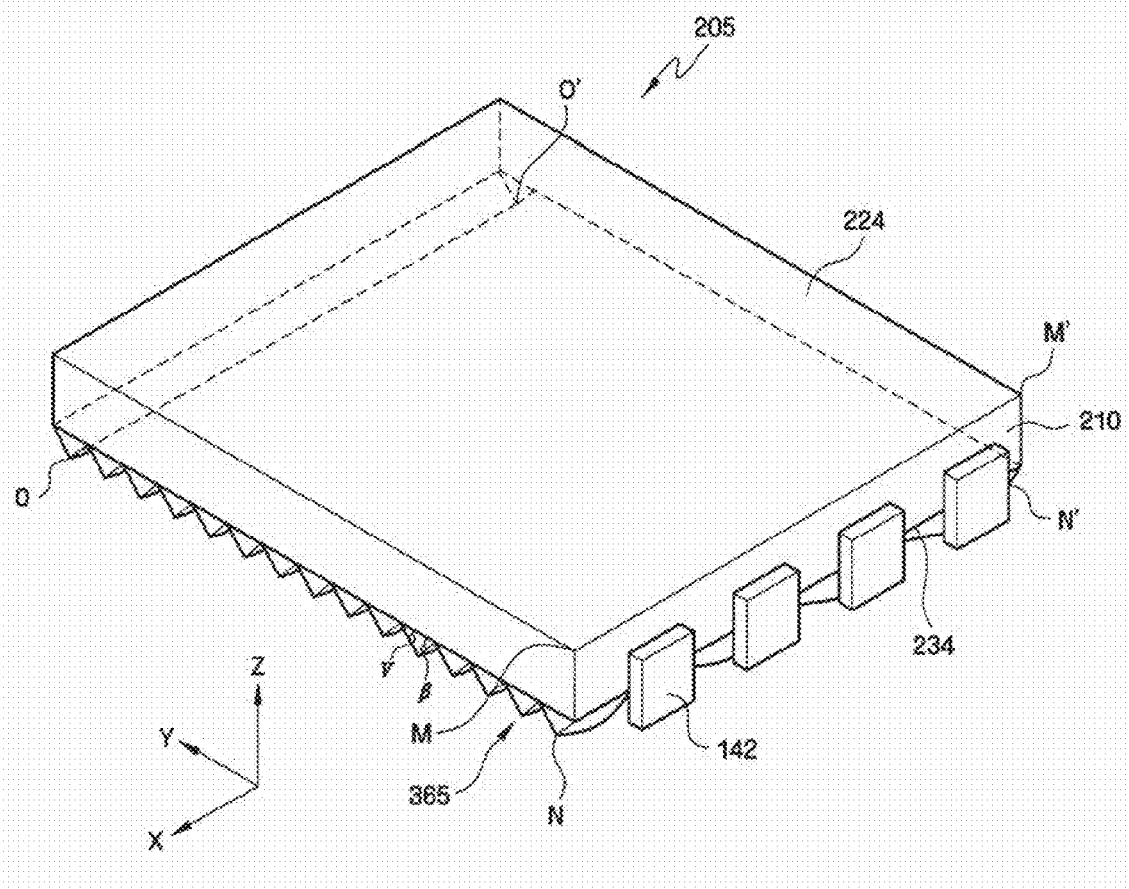
FIG. 12 is a perspective view showing an optical plate for a liquid crystal display device according to a sixth exemplary embodiment of the present invention.

Hereinafter, an optical plate for a liquid crystal display device according to a sixth exemplary embodiment of the present invention will be described in detail with reference to FIGS. 12 and 13. FIG. 12 is a perspective view showing an optical plate for a liquid crystal display device according to a sixth exemplary embodiment of the present invention, and FIG. 13 is a perspective view showing the bottom surface of the optical plate shown in FIG. 12.

Figure 13:
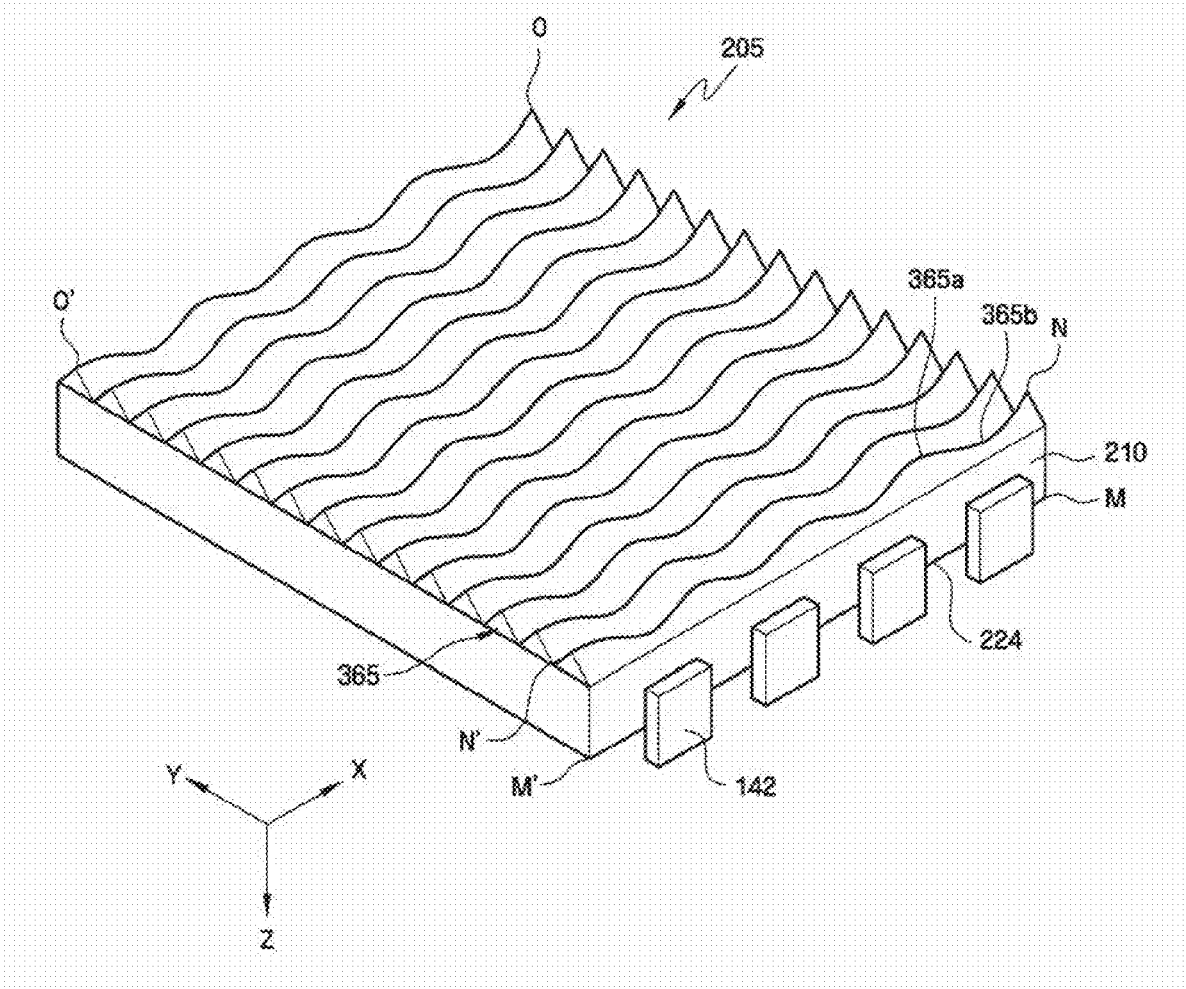
FIG. 13 is a perspective view showing the bottom surface of the optical plate shown in FIG. 12.

Referring to FIGS. 12 and 13, in the optical plate 205 of the present embodiment, a prism pattern 365 of the optical plate 205 may be separately formed from substrate's surfaces 210, 224, and 234 and then disposed on one surface 234 of the substrate's surfaces 210, 224, and 234. In addition, the prism pattern 364 may be formed of a material different from that of the substrate's surfaces 210, 224, and 234. The optical plate 205 of the present embodiment is substantially the same as that of the fifth embodiment except that the prism pattern 365 and the substrate's surfaces 210, 224, and 234 are formed separately from each other using different materials. The prism pattern 365 may be shaped of a film made of a monomer or copolymer such as polymethylmethacrylate (PMMA) or polyethyleneterephthalate, a transparent resin such as polycarbonate or polystyrene, a light-transmitting material such as transparent glass or transparent ceramic.

Figure 14:
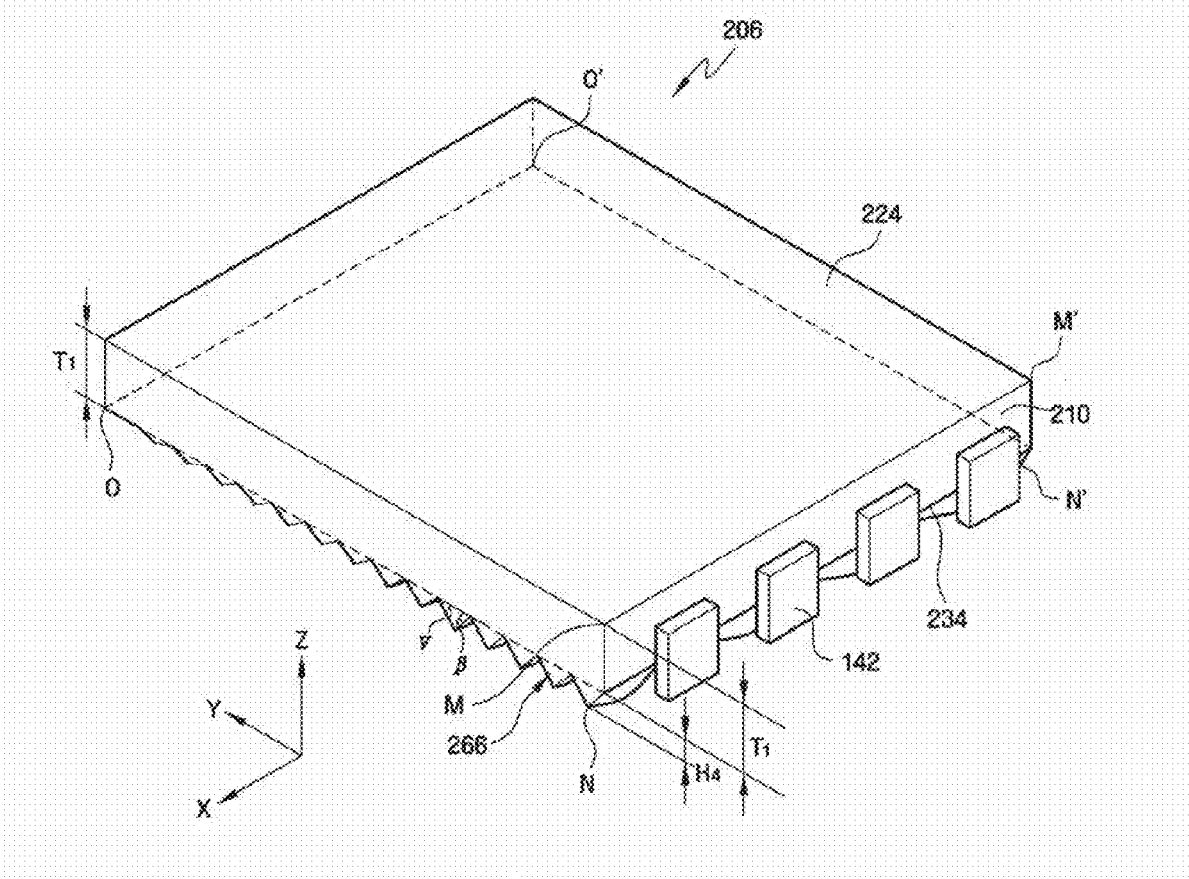
FIG. 14 is a perspective view showing an optical plate for a liquid crystal display device according to a seventh exemplary embodiment of the present invention.

Hereinafter, an optical plate for a liquid crystal display device according to a seventh exemplary embodiment of the present invention will be described in detail with reference to FIGS. 14 and 15. FIG. 14 is a perspective view showing an optical plate for a liquid crystal display device according to a seventh exemplary embodiment of the present invention, and FIG. 15 is a perspective view showing the bottom surface of the optical plate shown in FIG. 14.

Figure 15:
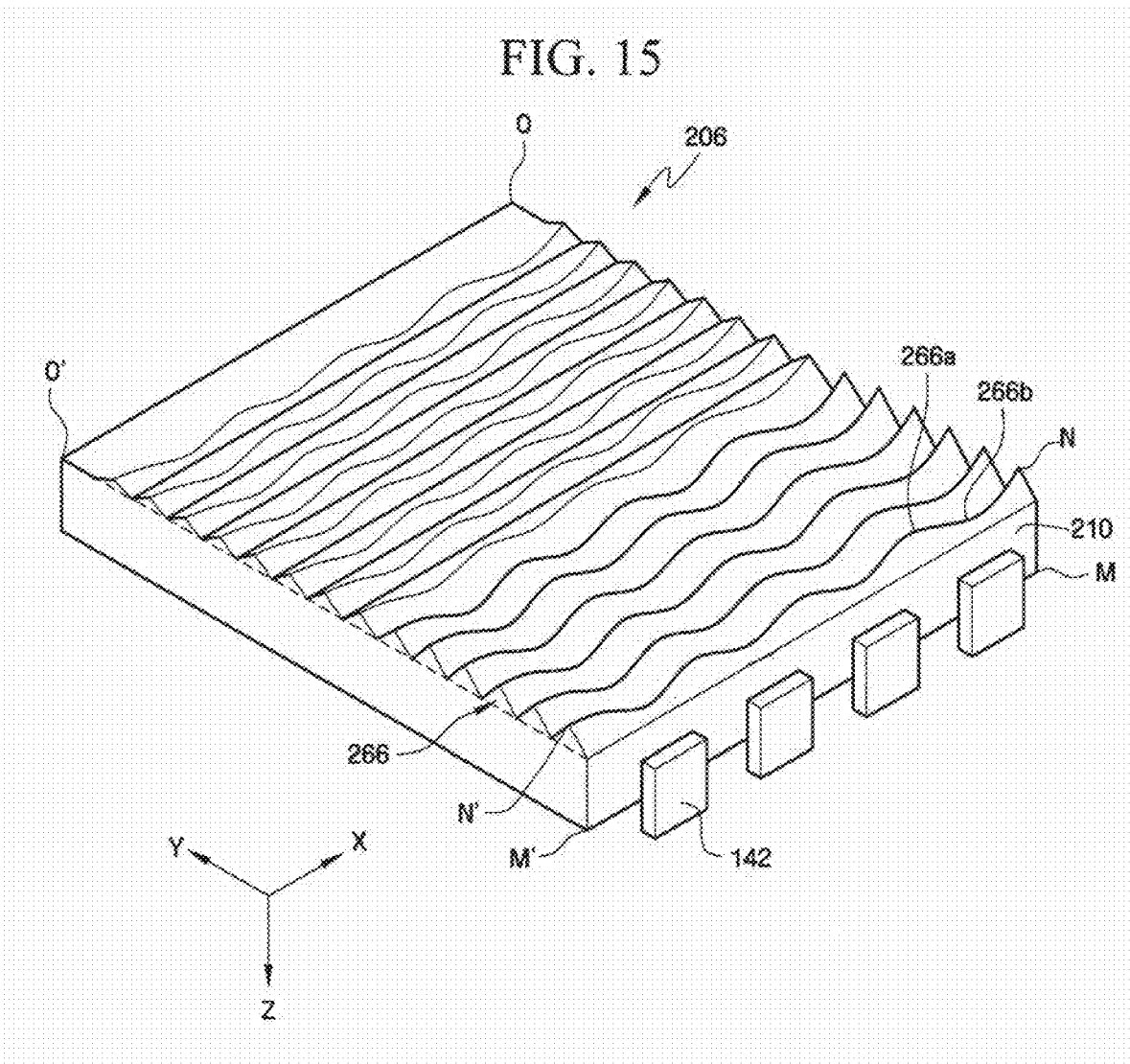
FIG. 15 is a perspective view showing the bottom surface of the optical plate shown in FIG. 14.

Referring to FIGS. 14 and 15, in the optical plate 206 of the present embodiment, light sources 142 are arranged on one surface 210 of substrate's surfaces 210, 224 and 234 in a first direction, i.e., the X-axis direction. A height $H_4$ of a prism pattern 266, as indicated by M-N or M'-N', gradually decreases along a second direction, i.e., the Y-axis direction perpendicular to the first direction, i.e., the X-axis direction. The height of the prism pattern 266 may become zero at one end O-O' of the substrate's surfaces 210, 224, and 234. In other words, the prism pattern 266 may not be provided at the end O-O' of the substrate's surfaces 210, 224, and 234. In this case, a height difference of the prism pattern 266 between a convex pattern 266a and a concave pattern 266b is maximum at the end N-N' of the substrate's surfaces 210, 224, and 234, and the height difference of the prism pattern 266 between a convex pattern 266a and a concave pattern 266b may become zero at the end O-O' of the substrate's surfaces 210, 224, and 234.

Since the light sources 142 are arranged at the end N-N' of the substrate's surfaces 210, 224, and 234, a brightness difference occurring between the area where the light sources 142 are disposed and the spacing between adjacent light sources 142 is reduced by the height difference between a convex pattern 266a and a concave pattern 266b. However, since the end O-O' of the substrate's surfaces 210, 224, and 234 is considerably spaced apart from the light sources 142, the brightness difference of the light sources 142 may be mitigated, so that a process of forming the prism pattern 266 may be omitted.

Figure 16:
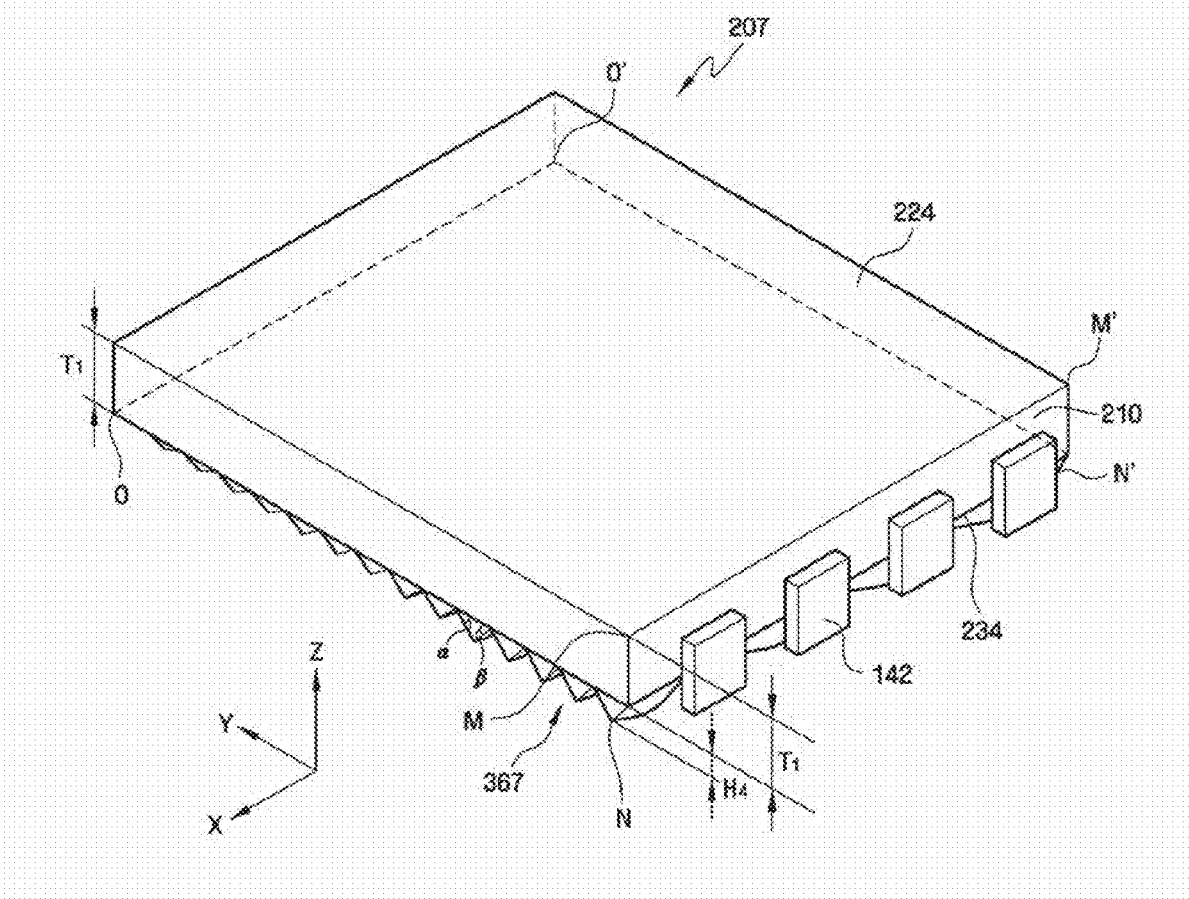
FIG. 16 is a perspective view showing an optical plate for a liquid crystal display device according to an eighth exemplary embodiment of the present invention.

Hereinafter, an optical plate for a liquid crystal display device according to an eighth exemplary embodiment of the present invention will be described in detail with reference to FIGS. 16 and 17. FIG. 16 is a perspective view showing an optical plate for a liquid crystal display device according to an eighth exemplary embodiment of the present invention, and FIG. 17 is a perspective view showing the bottom surface of the optical plate shown in FIG. 16.

Figure 17:
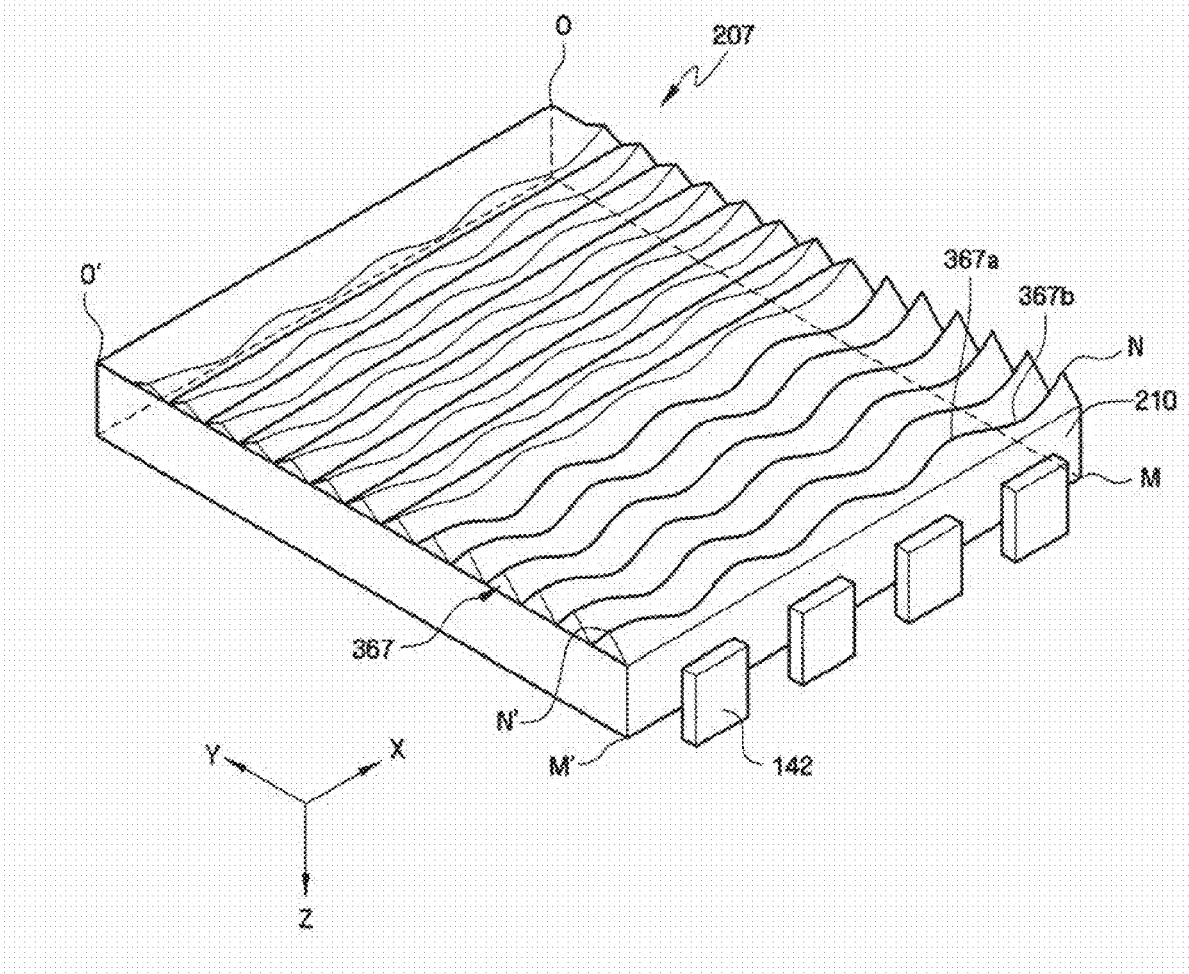
FIG. 17 is a perspective view showing the bottom surface of the optical plate shown in FIG. 16.

Referring to FIGS. 16 and 17, in the optical plate 207 of the present embodiment, a prism pattern 367 of the optical plate 207 may be separately formed from substrate's surfaces 210, 224, and 234 and then disposed on one surface 234 of the substrate's surfaces 210, 224, and 234. In addition, the prism pattern 367 may be formed of a material different from that of the substrate's surfaces 210, 224, and 234. The optical plate 207 of the present embodiment is substantially the same as that of the seventh embodiment except that the prism pattern 367 and the substrate's surfaces 210, 224, and 234 are formed separately from each other using different materials. That is, a height difference between a convex pattern 367a and a concave pattern 367b gradually decreases along a second direction, i.e., the Y-axis direction, from one surface 210 of the substrate's surfaces 210, 224, and 234 to the other surface. The height difference between the convex pattern 367a and the concave pattern 367b may become zero at the other surface of the substrate's surfaces 210, 224, and 234.

Figure 18:
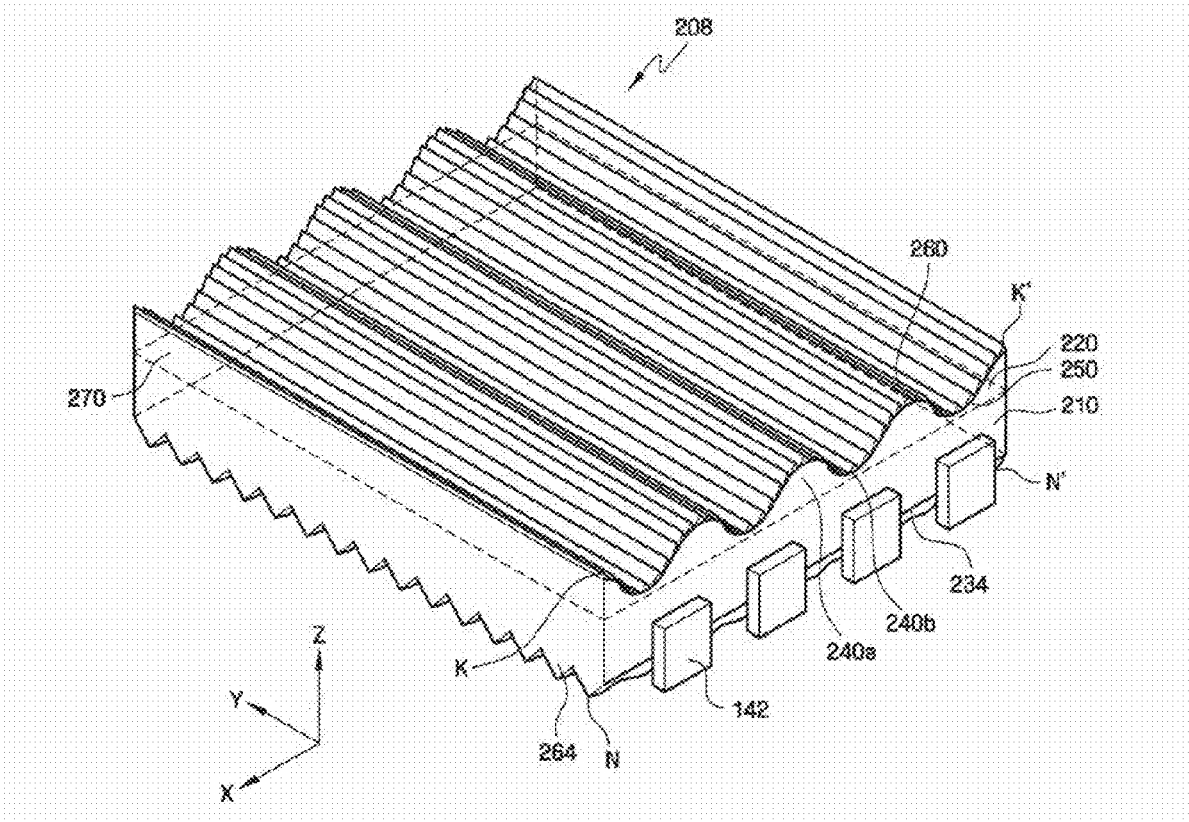
FIG. 18 is a perspective view showing an optical plate for a liquid crystal display device according to a ninth exemplary embodiment of the present invention.

Hereinafter, an optical plate for a liquid crystal display device according to a ninth exemplary embodiment of the present invention will be described in detail with reference to FIGS. 18 and 19. FIG. 18 is a perspective view showing an optical plate for a liquid crystal display device according to a ninth exemplary embodiment of the present invention, and FIG. 19 is a perspective view showing the bottom surface of the optical plate shown in FIG. 18.

Figure 19:
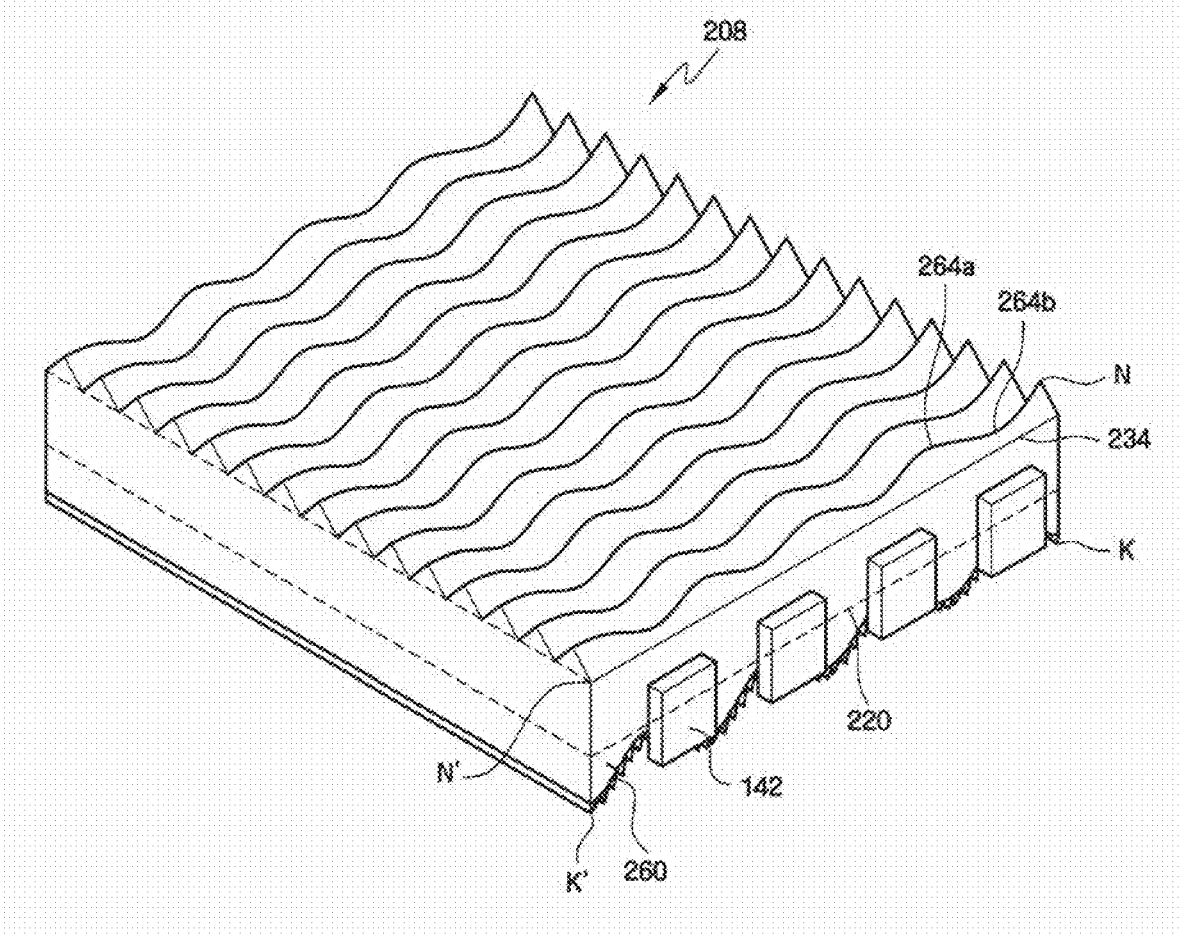
FIG. 19 is a perspective view showing the bottom surface of the optical plate shown in FIG. 18.

Referring to FIGS. 18 and 19, the optical plate 208 includes a height-varying portion, e.g., a curved portion 250, and a plurality of first prism patterns 264. The height-varying portion, e.g., the curved portion 250 comprises a plurality of convex patterns 240a and a plurality of concave patterns 240b, and is formed on one surface 220 of substrate's surfaces 210, 220, 234, and 270, not facing a reflection sheet 146. The plurality of first prism patterns 264 extend on one surface 234 of substrate's surfaces 210, 224, and 234 along the first direction, i.e., the X-axis direction.

Each of the first prism patterns 264 may include a height-varying portion. A top surface of each of the first prism patterns 264 comprises the plurality of convex patterns 264a each having a greater height than the average height $h_4$ (as illustrated, for example, in FIG. 10) of the first prism patterns 264, and the plurality of concave patterns 264b each having a smaller height than the average height $h_4$ of the first prism patterns 264, wherein the concave patterns 264b and the convex patterns 264a may alternate.

A liquid crystal panel (not shown) may be disposed at a side of the curved portion 250.

The convex portions 240a are formed to have a height greater than the average height from one surface 220 of substrate's surfaces 210, 220, 234, and 270 to the curved portion 250, and the concave portions 240b are formed to have a height smaller than the surface 220 of the substrate's surfaces 210, 220, 234, and 270 to the curved portion 250. The concave portions 240b alternate with the convex portions 240a. The convex portions 240a and the concave portions 240b may extend in the second direction, i.e., the Y-axis direction, substantially perpendicular to the first direction, i.e., the X-axis direction.

Second prism patterns 260 may be formed on the top surface of the curved portion 250. The second prism patterns 260 may be formed on the convex portions 240a or the concave portions 240b in parallel thereto in the second direction, i.e., the Y-axis direction.

A plurality of light sources 142 are arranged on one surface 210 of the substrate's surfaces 210, 220, 234, and 270 in the first direction, i.e., the X-axis direction, and are capable of emitting light. Each of the plurality of light sources 142 is disposed in vicinity of the concave portions 240b and the concave patterns 264b, thereby improving brightness uniformity of light emitted to the liquid crystal panel. A pitch between each of the plurality of light sources 142 may be the same as a spacing between adjacent concave portions 240b and adjacent concave patterns 264b.

In other words, the optical plate 208 of the present embodiment is a combination of the optical plates of the first and fifth embodiments of the present invention. However, a height difference between the average height (not shown) of the curved portion 250 to the thickness of the substrate's surfaces 210, 220, 234, and 270 and the maximum height (not shown) of the prism pattern 264 to the average height (not shown) of the prism pattern may be adjusted to obtain a different height difference than the previous embodiments.

Alternatively, although not shown, the optical plate 208 of the present embodiment may be a combination of one of the optical plates of the first through fourth embodiments of the present invention and one of the optical plates of the fifth through eighth embodiments of the present invention.

That is, the height of the first prism pattern 264 may gradually decrease along the second direction e.g., the Y-axis direction, substantially perpendicular to the first (X-axis) direction. A height difference between the convex portion 240a and the concave portion 240b gradually decreases along the second direction, e.g., the Y-axis direction. At least one of the curved portion 250, the second prism pattern 260, and the first prism pattern 264 may be integrally formed with the substrate's surfaces 210, 220, 234, and 270 using the same material. Alternatively, at least one of the curved portion 250, the second prism pattern 260, and the first prism pattern 264 may be formed separately from the substrate's surfaces 210, 220, 234, and 270.

While embodiments of the present invention have been particularly shown and described it will be understood by those of ordinary skill in the art that various changes in form and details may be made therein without departing from the spirit and scope of the present disclosure as defined by the following claims. It is therefore desired that the present embodiments be considered in all respects as illustrative and not restrictive, reference being made to the appended claims rather than the foregoing description to indicate the scope of the disclosure.

What is claimed is:

1. A liquid crystal display device comprising:
a liquid crystal panel,
a backlight assembly comprising an optical plate, and
a plurality of light-emitting diode (LED) light sources,
wherein the optical plate has a first surface substantially parallel to a bottom surface of the liquid crystal panel, and
wherein the optical plate includes a height-varying portion formed on a second surface opposite the first surface and extending fully in a first direction between a first lateral surface and a second lateral surface of the optical plate, and a triangular prism pattern formed along the height-varying portion and extending in the first direction,
wherein the plurality of LED light sources are arranged at a predetermined pitch in a second direction perpendicular to the first direction and facing a disposed directly on the first lateral surface of the optical plate,
wherein at least one of the plurality of LED light sources is disposed facing thinner portions of the height-varying portion, and
wherein the predetermined pitch corresponds to a distance measured between adjacent thinner portions of the height-varying portion.

2. The liquid crystal display device of claim 1, wherein an average thickness of the height-varying portion is in a range of about 0.1% to about 10% of a thickness of the optical plate.

3. The liquid crystal display device of claim 1, wherein a cross section of the height-varying portion forms a sine curve.

4. The liquid crystal display device of claim 1, wherein a radial direction of the triangular prism pattern is substantially perpendicular to the lateral surface of the optical plate.

5. The liquid crystal display device of claim 1, wherein the predetermined pitch between each of the plurality of light sources ranges from about 5 μm to about 15 μm.

6. The liquid crystal display device of claim 1, wherein a vertical angle of the triangular prism pattern ranges from about 90° to about 150°.

* * * * *